United States Patent [19]
Wesdorp et al.

[11] Patent Number: 5,338,560
[45] Date of Patent: * Aug. 16, 1994

[54] EDIBLE PLASTIC DISPERSION HAVING A RAPID GEL-SETTING STARCH

[75] Inventors: Leendert H. Wesdorp; Robert A. Madsen, both of Ellicott City, Md.; James Kasica, Whitehouse Station; Marie Kowblansky, Springfield, both of N.J.; Anthony Morrison, Bedford, Great Britain

[73] Assignee: Van den Bergh Foods Company, Division of Conopco, Inc., Lisle, Ill.

[*] Notice: The portion of the term of this patent subsequent to Jan. 18, 2011 has been disclaimed.

[21] Appl. No.: 976,236

[22] Filed: Nov. 13, 1992

Related U.S. Application Data

[63] Continuation-in-part of Ser. No. 899,443, Jun. 16, 1992, Pat. No. 5,279,844.

[51] Int. Cl.$^5$ .......... A23L 1/0522; A23L 1/0532; A23L 1/0526; A23L 1/0562
[52] U.S. Cl. .......... 426/573; 426/575; 426/576; 426/578; 426/602; 426/613; 426/589; 426/804; 426/603; 426/577
[58] Field of Search .......... 426/573, 578, 575, 576, 426/602, 603, 613, 589, 804, 577

[56] References Cited

U.S. PATENT DOCUMENTS

| | | | |
|---|---|---|---|
| 4,510,166 | 4/1985 | Lenchin | 426/578 |
| 4,911,946 | 3/1990 | Singer et al. | 426/658 |
| 4,937,091 | 6/1990 | Zallie | 426/661 |
| 4,956,193 | 9/1990 | Cain et al. | 426/573 |
| 4,971,723 | 11/1990 | Chiu | 426/575 |
| 5,153,020 | 10/1992 | Singer et al. | 426/567 |

FOREIGN PATENT DOCUMENTS

| | | |
|---|---|---|
| 0342738 | 11/1989 | European Pat. Off. |
| 0509707 | 10/1992 | European Pat. Off. |
| 0529892 | 3/1993 | European Pat. Off. |
| 91/12728 | 9/1991 | PCT Int'l Appl. |
| 2229077 | 9/1990 | United Kingdom |

*Primary Examiner*—Jeanette Hunter
*Attorney, Agent, or Firm*—A. Kate Huffman

[57] ABSTRACT

An edible plastic dispersion not having a continuous fat phase, including at least two condensed phases, at least one of which is continuous, the dispersion comprising a first gel-forming composition and a second gel-forming composition containing 1–8 times the critical concentrations of a gelling starch having a rheological property in an aqueous dispersion characterized by a one-half $G'_{max}$ value at no more than about 7,250 seconds when prepared at a concentration to yield a log $G'_{max}$ value of 5.0 at 15,000 seconds at 11° C. provided that the aqueous dispersion of the gelling starch is initially prepared at 0 to 40° C.

10 Claims, 3 Drawing Sheets

EDIBLE PLASTIC DISPERSION HAVING A RAPID GEL-SETTING STARCH

This application is a continuation-in-part application of U.S. Ser. No. 07/899,443 filed Jun. 16, 1992, now U.S. Pat. No. 5,279,844.

FIELD OF THE INVENTION

The present invention is concerned with edible plastic dispersions based on rapid gel setting starches with particular rheological properties.

BACKGROUND OF THE INVENTION

Edible dispersions with a plastic rheology usually have a high fat content. Often the fat is present as a continuous fat phase. Well-known edible, plastic dispersions are, for example, butter and margarine.

Many attempts have been made to find a replacement for fat in edible products. One reason why such a fat replacer is desirable is the wish to reduce the caloric content of the food product and other dietetic considerations while at the same time lower production cost, in particular by reducing raw material cost. If both goals are achieved a resulting product must still have consumer acceptable flavor, mouthfeel and long shelf life.

One proposal as a fat substitute has been the use of a non-caloric gaseous or solid material such as air or silica. Other proposed fat replacers include substances that are physically similar to triglycerides but that cannot be digested by the human body, such as waxes, e.g., jojoba oil, and sucrose poly fatty acid esters. See, for example, JAOCS 63(3) (March 1986), 278-288. The results of these approaches have thus far been less than satisfactory. One of the problems with the indigestible physical analogues of triglyceride fat is that the material is only available in limited quantities, and the material cost is high. The gaseous and solid materials referred to above can be used to replace only a small part of the fat. At higher inclusion levels these fat extenders severely affect the properties of the resulting product.

A substance that has been widely applied as a fat extender is water. This use of water has, for example, led to the introduction of the so-called halvarines: a substitute for butter and margarine containing only about 40% instead of the usual 80-85% fat. However, as with air, for example, water can also be employed only to a limited extent before adverse effects on the product properties are observed. To overcome this disadvantage it has been suggested that water should be used in combination with thickening agents, and in particular with gelling agents. This approach has led to substantial improvements of such products with substantially reduced fat content like halvarine.

However, with these approaches it has been possible to replace only part of the fat of edible plastic dispersions. When only thickening agents are employed in combination with the water, a still essentially liquid system that does not retain its shape is obtained. The use of gelling agents in such liquid systems was observed to produce aqueous gels having elastic or brittle properties rather than being plastic. Thus, the thickened gelled aqueous systems were used in edible plastic dispersions only as fat extender to replace part of the fat. To maintain the required plastic rheology of the product, the use of a not negligible amount of fat, usually constituting the continuous phase of the edible plastic dispersion, was still necessary.

Although it has been stated in the art that certain gelled aqueous system have plasticity and spreading characteristics such that they can be used by themselves as spreads, e.g., for bread, to replace butter or margarine, in practice these systems were not found to be satisfactory. The gels were too elastic or brittle to be acceptable as a replacement for a plastic product. Moreover, the organoleptic properties of the products usually were poor.

Plastic Dispersions having relatively good plastic rheology are described in Cain et al., U.S. Pat. No. 4,956,193 issued on Sept. 11, 1990. These edible plastic dispersions do not have a continuous fat phase and include at least two condensed phases, at least one of which is continuous. The compositions contain (a) one gelling agent selected from the group of gelatin, kappacarrageenan, iota-carrageenan, alginate, agar, gellan, pectin and mixtures thereof and, (b) a second gelling agent selected from the group of a gelling starch, denatured whey protein, denatured soy protein, microcrystalline cellulose and mixtures thereof and one gelling agent is different from the other gelling agent.

It has been observed that these plastic dispersions can be quite slow gelling and take up to several weeks to gel set to a consistency which is useful for a resulting spread product. Some faster gel setting starches have been found to produce brittle or rubbery dispersions having off-flavors and poor mouthfeel. Further, some of such spreads have been seen to possess phase separation and lack stability on the shelf.

SUMMARY OF THE INVENTION

It is thus an object of this invention to provide edible plastic dispersions based on rapid gel setting starches with particular rheological properties. Such compositions improve manufacturing processes while providing products with longer shelf-life stability and improved flavor, Texture is also improved in products, The plastic dispersions of the present invention do not possess a continuous fat phase and include at least two condensed phases, at least one of which is continuous, The improved dispersion comprises:

a) a gelling composition containing a gelling agent in an amount of 1-8 times the critical concentration, and b) a continuous gel-forming composition containing a gelling starch in an amount of 1-8 times the critical concentration, the gelling starch having a rheological property in an aqueous dispersion characterized by a one half $G'_{max}$ at no more than 7,250 seconds when prepared at a concentration to yield a log $G'_{max}$ value of 5.0 at 11° C. at 15,000 seconds, provided that the aqueous dispersion of the gelling starch is initially prepared at 0° C. to 40° C.

Preferred gelling starches reach one half $G'_{max}$ between 4,000 seconds and 7,000 seconds and most preferred gelling starches reach one half $G'_{max}$ between 5,500 seconds and 6,500 seconds.

If an aqueous dispersion of the gelling starch is initially prepared at 80° to 100° C. than the gelling starch has a rheological property in aqueous dispersion characterized by a one-half $G'_{max}$ at no more than 9,600 seconds when prepared at a concentration to yield a log $G'_{max}$ value of 5.0 at 11° C. and at 15,000 seconds.

At least one of the gelling agent and the gelling starch is an aggregate-forming gelling agent and neither the gelling agent nor the gelling starch is a non-waxy granular or unmodified starch.

Applicants have surprisingly discovered that starches purified by the process disclosed in U.S. Ser. No. 07/832,838 filed Feb. 7, 1992 by Kasica et al., and incorporated by reference may be used in compositions to eliminate starch off-flavor and provide products with improved flavor.

DETAILED DESCRIPTION OF PREFERRED EMBODIMENTS

Figure 1:
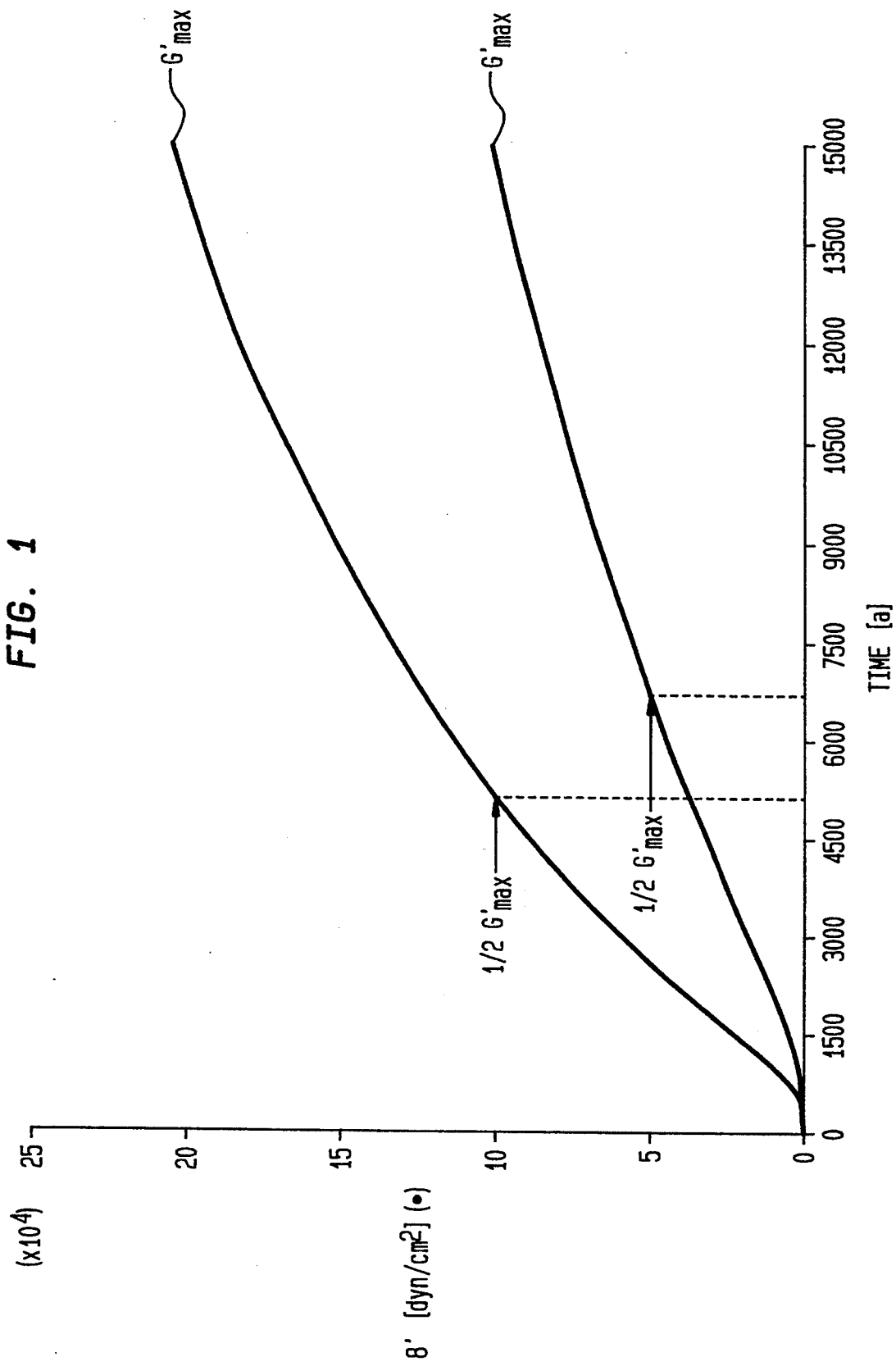
FIG. 1 illustrates gelling characteristics of a starch blend (6110:97-2) preferred for use in the plastic dispersions of this invention. In this figure, elastic modulus G' [dyne/cm$^2$] of the aqueous starch dispersions at two starch concentrations is plotted against the time elapsed in seconds following the dispersion of the starch in water. Test methods illustrated in this graph are set forth in the testing methods herein.

The term "aqueous starch dispersion" shall mean an aqueous solution of gelatinized starch or a colloidal dispersion of starch in water.

The terms "plastic dispersion" or "edible plastic dispersion" shall mean a dispersion having a gelling agent and a gelling starch as described hereinafter.

A product according to the invention does not have a continuous fat phase to have the required plastic rheology. At least two condensed, i.e., distinctive, phases must also be present. We have also found that, if the end product is to have the required plasticity, its overall composition preferably comprises both gel-forming compositions described above.

The plastic dispersions according to the invention have rapid gel setting properties, good break-down properties in the mouth, satisfactory flavor characteristics and a long shelf life stability. It can have an oral response more similar to that of conventional, edible plastic dispersions, e.g., spreads such as butter, margarine and halvarine than prior art dispersions.

The presence of two or more condensed phases in the present dispersion can be observed microscopically in a conventional manner using e.g., staining techniques. The dispersion has at least one continuous condensed phase. If the dispersion contains, for example, two condensed phases, then the product can be either a so-called filled gel, in which case the second phase is a dispersed phase, or it can be a bi-continuous system wherein both condensed phases are continuous. Thus, the term "dispersion" as used throughout this application is meant to also encompass compositions containing two or more continuous condensed phases.

Either the gelling agent or the gelling starch can be a single substance or it can be a mixture of gelling materials. As the gelling agent, for example, gelatin can be used. As the gelling starch, for example, a starch can be used, which contains a mixture of amylose, a gelling material, and amylopectin, a non-gelling material. Alternatively, for example, a mixture of kappa- and iota-carrageenan can be employed or a mixture of these two gelling agents with e.g., gelatin. Other gelling agents which are suitable include alginate, agar, gellan pectin, furcelleran, locust bean gum, guar gum, xanthan gum and mixtures thereof.

The critical concentration of the gelling agent and the gelling starch (which may be a mixture of biopolymers) in a composition is the concentration at which the formation of the gel begins to be possible. The critical concentration of the gelling agent and starch not only depends on the nature of that gelling material but also on the composition of the aqueous system in which it is to form the gel, e.g., on the presence and concentration of salt, sugar, flavor compounds, etc. Consequently, the critical concentration of the gelling agent in the gel-forming composition may change if the kind or amount of one of the other ingredients contained in the composition is varied.

The critical concentration of a gelling material in a particular composition can be calculated from measurements of the shear modulus of a series of samples containing different concentrations of the gelling material, as described in Br. Polymer J. 17, (1985), 164. If a mixture of gelling agents or starches is used, then the critical concentration of that mixture is determined in an analogous manner. The composition of the mixture of gelling agents or starches is kept constant and the weight concentration of the mixture is varied as if it consisted of only a single gelling material.

Furthermore, a preferred embodiment of the invention provides an edible plastic dispersion that does not have a continuous fat phase, that includes at least two condensed phases, at least one of which is continuous, and that is obtainable by a process that includes mixing (a) a first gel forming composition comprising a gelling agent in an amount of 1-8 times the critical concentration, and (b) a second gel forming composition comprising a gelling agent in an amount of 1-8 times the critical concentration, the gelling starch having a rheological property in an aqueous dispersion characterized by a one half $G'_{max}$ at no more than 7,250 seconds when prepared at a concentration to yield a log $G'_{max}$ value of 5.0 at 15,000 seconds at 11° C., after the gelling starch is substantially completely dispersed in an aqueous medium at 25° C. wherein (i) at least one of the gelling agents or the gelling starch is an aggregate-forming gelling material; and (ii) neither the gelling agent nor the gelling starch is a non-waxy granular starch at a temperature such that the mixture obtained is fluid and cooling the mixture causes it to set.

The level of microheterogeneity (see below) can be established by microscopic investigation. In this manner it can be determined whether a product consists of only a single condensed phase or whether more than one phase is present. Similarly, it is possible to determine whether the product contains aggregates. It is also possible to obtain information about the chemical composition of the overall product.

At present no methods are available to determine the chemical composition of the various condensed phases of a dispersion separately. General information can be obtained of the chemical composition of a particular phase using various stains, for example. In this manner, it can be determined whether a particular phase contains protein or starch, but little information about the type of protein or starch or its concentration in that phase is obtained. The present state of the art does not always provide a means to determine experimentally whether a particular condensed phase of a dispersion is a gel, i.e., whether that phase contains a gelling material in a concentration above its critical concentration.

(For a review of methods for assessing heterogeneous gel systems, see J. Colloid and Interface Sci., 81, (1981), 519).

Thus, at present there is no way of knowing how the composition of the two gel-forming compositions relate to the composition of each of the condensed phases of the plastic dispersion. We do not wish to be bound by theory, but we believe, however, that for plasticity to be obtained, it is necessary that the continuous phase (or the main continuous phase) if there is more than one phase should be a gel of moderate strength.

In order to obtain plasticity, it is preferred that there should be two or more gelled phases. In a system consisting of such a plurality of condensed phases, regions occur which are, in principle, homogeneous within the region but which are different from neighboring regions, which themselves are again homogeneous (disregarding for the moment in homogeneities that may be present within one phase owing to, for example, the presence of aggregates). The change in composition going from one region to a next occurs across a rather small border. We believe the presence of such regions, with daily abrupt changes in composition going from one region to another (i.e., going from one condensed phase to another) to be necessary to obtain a plastic product. A gelled system of this type can suitably be referred to as a microheterogeneously phase separated system.

We have further found it to be preferred, in order to obtain a plastic dispersion, that at least the gelling agent or the gelling starch be an aggregate-forming gelling material. If the aggregate-forming gelling material comprises a mixture of gelling materials, then it is sufficient if one of the components of the mixture constituting the gelling agent or the gelling starch is an aggregate-forming gelling material.

The aggregates formed by the aggregate-forming gelling material preferably have a compact shape (e.g., with dimensions in the three directions not largely different) rather than a long, thin rod-like shape.

An aggregate-forming gelling material may be defined as one which gives rise to a three-dimensional network where the units composing the network are particles much larger in size than the molecules of the gelling agent or the gelling starch itself. Thus usually means that the network will be based on units larger than 0.01 microns diameter (or thickness if rod-like aggregates are concerned).

The presence of a network of the aggregate-forming gel type may be demonstrated by measuring the turbidity of the gel. In the turbidity experiment, for a gel of thickness d cm, the turbidity meter yields a value for 10 g ($I/I_o$), where $I_o$ is the incident intensity of visible light at a wavelength where no significant absorption effects are present, and I is the transmitted intensity. The relation $$ln(I/I_o) = -Sd$$

can then be used to determined a linear scattering coefficient $S(cm^{-1})$ characteristic of the material concerned. To obtain reliable results, it is advisable to measure I at different path lengths d, so as to obtain a value for S independent of d. The result S then depends on the concentration of the gelling agent or the gelling starch and on the degree of heterogeneity of the network concerned.

In order to establish whether a particular gelling material present in a dispersion according to the present invention acts as an aggregate-forming gelling material, the pH and ionic strength of the sample that is being analyzed should be similar to the pH and ionic strength of said dispersion. Moreover, the gelled sample should be prepared by applying the same heating regime as in the preparation of the dispersion. The turbidity measurements are furthermore suitably carried out at a temperature representative of the temperature at which the product is normally used. In general, the results obtained at room temperature give a clear indication as to whether or not a gelling agent or a gelling starch acts as an aggregate-forming gelling material.

In order to establish whether or not a gelling agent or a gelling starch is of the aggregate-forming type, the linear scattering coefficient at a concentration of thrice the critical concentration should be at least $0.1 \text{ cm}^{-1}$. Best products however, are obtained when aggregate-forming gelling agents or starches are applied, having a linear scattering coefficient of at least $1 \text{ cm}^{-1}$, at twice their critical concentration.

Where S is large, the method described may only be practically feasible, i.e., give an accurate value, if very small path lengths are adopted and if multiple-scattered light can be excluded from the detector. The fact, however, that such a high value for S is observed clearly indicates that the gel network is based on an aggregate-forming gelling material.

If, for some reason, the outcome of the above-mentioned method is not unambiguous, it is advisable to demonstrate the presence (or absence) of in homogeneities in network structure by means of electron microscope approaches such as, for instance, transmission studies on gel section, scanning electron microscopy, freeze factor etc. The presence of such in homogeneities is a clear indication of the presence of aggregates.

Suitable aggregate-forming gelling materials known in the art are, for example, conversion starch products such as Instant N-Oil ® II Starch supplied by National Starch and Chemical Company of Bridgewater, NJ, denatured whey protein, denatured bovine serum albumin, denatured soy protein microcrystalline cellulose and certain hydrolyzed starch products such as Paselli SA2 ® maltodextrin supplied by Avebe of Holland. Gelling agents which are not suitable as aggregate-forming gelling agents include carrageenan, agar and intact whey protein.

Preferably, the dispersion comprises aggregates having a mean size in the range of 0.01 to 10 μm. More preferably, the mean size is 0.05 to 1 μm. The mean size of the aggregate is determined from microphotographs. A favorable aspect of the presence of aggregates in the present dispersion is that they are of the size that can scatter light. This combined with a not negligible difference in refractive index between the aggregates and their surroundings, causes the dispersion to be opaque, which contributes to strengthen the similarity between the present product and conventional plastic dispersions such as margarines and halvarines. The presence of aggregates can be shown experimentally by a number of techniques such as typically light scattering methods, of which turbidity is a simple example, and electron microscopy. (Experimental procedures and theories of light scattering are described by M. Kerker in The Scattering of Light and other Electromagnetic Radiation, 1969, Academic Press, New York. ) For practical purposes, useful information about the presence of aggregates can be obtained from photomicrographs.

Gelling Starch

The starches suitable for use herein are characterized by a rapid gel set during manufacture of the spread dispersion and by shelf-life stability during spread storage. Particularly preferred starches further lack off-flavor from the starch source and provide a spread with good texture and mouthfeel.

A starch or starch blend suitable for use in the invention must be a gelling starch or a blend of starches containing at least one gelling starch having specific rheological properties as described below.

$G'$ is the elastic modulus of a gel measured in dynes/cm$^2$. To measure $G'$ values, a selected starch or starch blend is completely dispersed in water at a concentration to yield a log $G'_{max}$ max of about 5.0 at 11° C. The dispersed starch is then placed on a rheometer plate at 11° C. and measurements are taken periodically up to 15,000 seconds. The value of $G'$ at 15,000 seconds will be between 4.0 and 6.0 and designated $G'_{max}$. The time required for the starch sample to reach one half $G'_{max}$ value is read from the rheometer plot as elapsed time in seconds. A detailed description of the starch rheology test used in this invention is described in the testing methods section below.

The rheological properties of the starch or starch blend in aqueous dispersions are characterized by a one half $G'_{max}$ value at no more than 7,250 seconds, when prepared at a concentration to yield a log $G'_{max}$ value of 5.0 at 11° C. and initially dispersed at 25° C. The gelling properties of spreads containing such starches are preferably obtained when the one half $G'_{max}$ values are 4,000 to 7,000 seconds. Most preferably, spread dispersions contain starches that have one-half $G'_{max}$ values at between 5,500 to 6,500 seconds when the log $G'_{max}$ is 5.0 at 11° C.

Starches having suitable rheological properties may be derived from any starch source, including corn, potato, tapioca, sweet potato, wheat rice, sago, waxy maize, high amylose corn, sorghum, and the like. The conversion products derived from any of these starches, including fluidity or thin-boiling starches prepared by oxidation, alpha-amylase (enzyme) conversion, mild acid hydrolysis or heat dextrinization are preferred for use herein. Suitable preferred starches include converted starches having a dextrose equivalent (DE) of less than about 15.0 or a hot flow viscosity of about 8 to 80 seconds at 55° C. at 25% solids or a water fluidity (WF)$\geq$30.

The term "dextrose equivalent" refers to the reducing power (or the reducing sugar content) of starch hydrolysates calculated as dextrose (dextrose or glucose has a DE=100) on a dry weight basis. Starches (or maltodextrins) having a high DE have lower molecular weights (are more highly converted) than those having a low DE. Methods for determining starch hot flow viscosity, funnel viscosity and water fluidity are described in Zallie (U.S. Pat No. 4,934,091) and Lenchin (U.S. Pat. No. 4,510,166), herein incorporated by reference.

Also preferred for use herein are starches that have been debranched, by treatment with an endo-alpha-1,6-glucanohydrolase, such as pullulanase or isoamylase, to provide a partially debranched starch product having a funnel viscosity at 19% solids of less than about 20 seconds at 22° C. and comprising 30 to 75% short chain amylose (a linear polymer containing from about 15 to 5 anhydroglucose units linked by alpha-1,4-D-glucosidic bonds). Partially debranched starches that may be selected for use herein are described in U.S. Pat. No. 4,971,723, issued Nov. 20, 1990 to Chiu, which is hereby incorporated by reference.

Also preferred for use herein as an optional component of starch blends containing a gelling starch are pregelatized, precooked, cold water swelling starches, and derivatized starches such as ethers and esters and other modified starches. Any combination of modifications of starches may be employed herein, provided that the starch, or starch blend containing such starch is, or contains, a gelling starch and has the rheological properties described herein. Methods for preparing modified food starches are well known in the art. See, e.g., M.W. Rutenberg, "Starch and its Modifications", p. 22–36, in *Handbook of Water-Soluble Gums and Resins*, R.L. Davidson, Editor, McGraw Hill, Inc., New York, NY, 1980, which is hereby incorporated by reference.

A method for enzymatic conversion of starch with an alpha-amylase to produce a converted starch is disclosed in U.S. Pat. No. 4,726,957 to Lacourse, et al., which is hereby incorporated by reference. Methods for combining one or more conversion techniques, depolymerization processes and derivatization processes are disclosed in U.S. Pat. No. 4,937,091, issued Jun. 26, 1990, to Zallie, et al. Preferred starch derivatives include those approved for use in foods, such as hydroxypropyl starch ethers, starch acetate esters, starch octenylsuccinate and succinate half-esters and starch phosphate esters, and blends thereof. Hydroxypropyl starch ethers (prepared by reacting starch with propylene oxide) are preferred for optimizing the texture of the spread.

Any starch or starch blend having suitable rheological properties for use in the spreads herein may be purified by any method known in the art to remove starch off-flavors and colors that are native to the starch or created during starch modification processes. Purification processes preferred for treating the starches used in the spreads of this invention are disclosed in U.S. Ser. No. 07/832,838, filed Feb. 7, 1992, by Kasica, et al.

Preferably, the improved edible plastic dispersion comprises the first gel-forming composition containing a gelling agent in an amount of 1–5 times the critical concentration. Similarly, the concentration of the gelling starch in the second gel-forming composition is preferably 1–5 times the critical concentration of that gelling starch in that gel-forming composition. The dispersion preferably comprises both gel-forming compositions in respective amount of of 0.1–99 wt. % and 99.9–1 wt. %, more preferably in amounts of 5–95 wt. % and 95–5 wt. % of the dispersion, respectively. Most preferably, the dispersion comprises 20–80 wt. % of the gelling agent containing composition and 80–20 wt. % of the gelling starch containing composition.

Preferably, besides the aggregate-forming gelling material, the plastic dispersion comprises a non-aggregate-forming gelling material of the kind that, when used on its own, forms gels that are relatively elastic, e.g., gelatin. These non-aggregate-forming gelling agents may be characterized by the fact that they tend to form a gel network composed of strands and/or units of molecular dimensions.

The gelling agent of the first gel-forming composition preferably is gelatin, kappa-carrageenan, iota-carrageenan, alginate, agar, gellan, pectin or a mixture of two or more thereof. More preferably, the gel-forming composition comprises gelatin or pectin.

The compositions may also comprise dairy and non-dairy ingredients as a source of fat, flavoring and protein. The amount of the ingredient present in the composition is selected depending on the effect of the protein ingredient on mouthfeel and sourness.

The dairy fat can be derived from any dairy source such as whole milk, semi-skimmed milk, skimmed milk, cultured buttermilk, butter milk powder, skimmed milk powder, yogurt, quark, fromage frais, cottage cheese, whey powder, butter, etc.

To effect the flavor of the spreads of the invention dairy fat may optionally be incorporated in the product by using at least 3 wt. % of a dairy ingredient in the spread. The optimum level of dairy ingredients will be dependent on the type and fat level of the dairy product. Also combinations of dairy products may be used.

If whole milk, semi skimmed milk, skimmed milk or combinations thereof are used, the total level thereof is preferably from 40 to 85 wt. % of the composition, more preferred 50–80 wt. %, most preferred 55–80 wt. %.

If yogurt, quark, cottage cheese or fromage frais or a combination thereto is used, the total level is preferably from 2–40 wt. %, more preferred 5–30 wt. %. Under some circumstances it may be advantageous to use a mixture of milk and these ingredients, for example in weight ratios between 20:1 and 2:1, the total level of yogurt/quark/cottage cheese/fromage frais and milk being from 60–85 wt. %.

In addition to the above mentioned ingredients, spreads of the invention may comprise a number of optional ingredients such as flavoring, flavoring sugars (e.g., lactose) salt, preservatives, acidifiers, vitamins, coloring materials etc.

Preferably the level of flavoring materials (other than those which are incorporated through the dairy ingredients) is less than 0.5 wt. %, for example 0.01 to 0.2 wt. %. In a preferred embodiment of the invention, however, spreads are free from flavoring ingredients other than those incorporated through the dairy ingredients. Preferably the level of salt (sodium chloride) is from 0–4 wt. %, more preferred 0.1 to 3 wt. %, most preferred 0.5 to 1.7 wt. %.

Preservatives are preferably incorporated at a level of 0–4 wt. %, more preferred 0.01 to 1 wt. %, most preferred 0.05 to 0.3 wt. %. Especially preferred is the use of potassium sorbate. A preferred coloring material is beta carotene; preferred levels of coloring material are from 0–1 wt. %, more preferred 0.01 to 0.2 wt. %. Acidifiers may be incorporated to bring the pH of the product to the desired level, preferably the pH of the product is from 3 to 10, more preferred 3.5 to 7. A suitable acidifier is for example lactic acid or citric acid.

Another optional ingredient which may be present in compositions of the invention are proteins. Preferably the protein level in spreads of the invention is 0–15 wt. %, more preferred, up to 6 wt. %, most preferred up to 4%. In an especially preferred embodiment of the invention the protein are partially or wholly obtained from dairy sources. In another preferred embodiment of the invention the protein is wholly or partially a vegetable protein, especially soy bean protein. For example if mixtures of these ingredients are used suitable with ratios of dairy protein to vegetable protein may for example be from 10:1 to 1:10.

It is further preferred that the plastic dispersion comprises a thickening agent. The presence of a thickening agent can improve the oral response of the dispersion. A particularly preferred thickening agent is xanthan gum. Under mastication and during break-down of the dispersion, the structure produced by such thickening agent breaks down to some extent but prevents the product from getting very thin rapidly and causes some residual viscosity to be maintained, leading to a desirable consumer property.

To obtain optimal organoleptic characteristics, it is preferred for the dispersion to have a continuous phase that melts at a temperature between about 20° C. and about 45° C., more preferably between about 30° C. and about 37° C. This facilitates break-down in the mouth and prevents the dispersion from being perceived as waxy. The melting temperature of a gel can be measured using the following procedure: pour the sample into a glass test tube and allow it to set fully at 5° C. Then, place the tube in a water jacket connected to a programmable water bath. Place a steel ball on the surface of the sample and depress slightly in order to minimize surface tension effects. Equilibrate for one hour at 25° C. and then apply a heating regime of 0.5% C/min. The gel melting point is the temperature at which the ball begins to fall through the sample. Movement of the ball can be observed using a traveling microscope.

As described above, the plastic dispersion should have a continuous condensed phase and at least one other condensed phase, which may be either dispersed or continuous. It has been found advantageous, however, and it is therefore preferred that the dispersion should comprise two continuous condensed phases. The product may also have more than two continuous condensed phases.

A "continuous phase" is not composed of discrete parts, but essentially extends in various directions throughout the product. From microscopic pictures of bi- or tri-continuous systems it may appear as if one of the phases does not extend throughout the product, and is in fact a dispersed phase, albeit one of which the discrete parts have capricious shapes. However, usually such phases are continuous. The incorrect impression is caused by the fact that the microscopic picture merely gives an incomplete two-dimensional image of the three-dimensional reality.

In addition to the gelling agent, gelling starch and solvent, the dispersion may comprise other ingredients as is considered desirable in view of the envisaged use by the consumer of the end product. For example, the dispersion may comprise coloring matter, e.g. beta-carotene, taste and flavor compounds, e.g., sodium chloride, or non-gelling milk protein, preservative, e.g., potassium sorbate, and thickening agents, e.g., non-gelling starch and/or protein and gums, e.g., xanthan gum. Preferably, both gel-forming compositions are composed such that both contain ingredients other than the gelling materials in essentially the same concentrations. The liquid employed in the gel-forming compositions which is to act as solvent in which the gelling materials should be capable of forming gels, preferably consists essentially of water. However, a mixture of water with e.g., some alcohol, preferably ethanol, or another non-toxic liquid, can be employed as well.

The dispersion may further comprise material that forms an (additional) dispersed phase in the dispersion. For example, the dispersion may contain small particles of herbs and vegetable. The dispersion can then, for example, be used as vegetable spread. similarly, finely ground nuts or small cheese particles may be included to obtain a nut or cheese spread, respectively. Including such nut or cheese particles in the dispersion implies that some fat is incorporated in the dispersion. Preferably such fat is contained in a dispersed phase and does not form a continuous phase.

It should be appreciated, however, that the compositions according to the invention may be employed in fat continuous systems such as those described in Cain et al., U.S. Pat. No. 4,917,915, herein incorporated by reference. To meet certain consumer wishes, it may also be desirable to include some fat as such (as distinguished from fat contained in e.g., nuts or cheese) in the dispersion. Such fat should then, preferably, be present as the dispersed phase. Accordingly, in a preferred embodiment the dispersion further comprises a dispersed fat phase.

Preferably, the total fat content of the dispersion does not exceed 20 wt. %. More preferably, the fat content of the dispersion is 1–10 wt. % of the dispersion and most preferably 0 to 4 wt. %. The fat present in the dispersion may be from a dairy source, non-dairy source or mixtures thereof, such as the dairy sources discussed above or vegetable oil. Example include butterfat, palm oil, palm mid-fraction and/or coconut oil. Some butterfat may, for example, be included in the dispersion by using as solvent in the gel-forming compositions whole milk or partially defatted milk or a mixture thereof with water. In this way, the fat incorporated in the product will be present in the form of small fat globules. It has been found to be beneficial for the organoleptic properties of the product if any fat included in the product is included in the form of small globules. The volume weighted mean diameter of the fat globules is preferably less than 20 $\mu m$. This can suitably be achieved, for example by homogenation of the composition at a temperature at which it is essentially liquid, followed by cooling to allow the product to set.

Testing Methods

Starch Rheology Test

Rheology tests of starch dispersions were carried out on a Rheometrics Dynamic Mechanical Analyzer Instrument Model RFS2 (obtained from Rheometrics Company, Piscataway, New Jersey). The instrument was set at an oscillating frequency of 0.5 rad/sec and a deformation strain of 1%. Measurements were taken at 11° C. every 60 seconds for a total of 15,000 seconds in units of dynes/cm$^2$(G'). The rheology test measured the rate of formation of the starch gel as well as the stability of the starch gel after formation.

Starch dispersions were prepared from starch samples and distilled water at a starch solids percentage suitable to reach a log $G'_{max}$ of 4.0 to 6.0 on the Rheometrics Instrument Starches used in Examples 1–6 below (Paselli SA2 ® maltodextrin; 78-0296, 6110:97-2, 6110:97-3 and 78-0323 starches) were prepared and measured according to this described starch rheology test.

For example, in the case of starch blend 6110:97-2 dispersions containing from 16 to 20% starch blend solids were prepared for rheological testing. For Paselli SA2 starch control samples, dispersions containing 25 to 30% starch solids were prepared. For purified starch 78-0296, dispersions containing about 25% starch solids were prepared so that measurements could be made in the log $G'_{max}$ range of 4.0 to 6.0.

Figure 2:
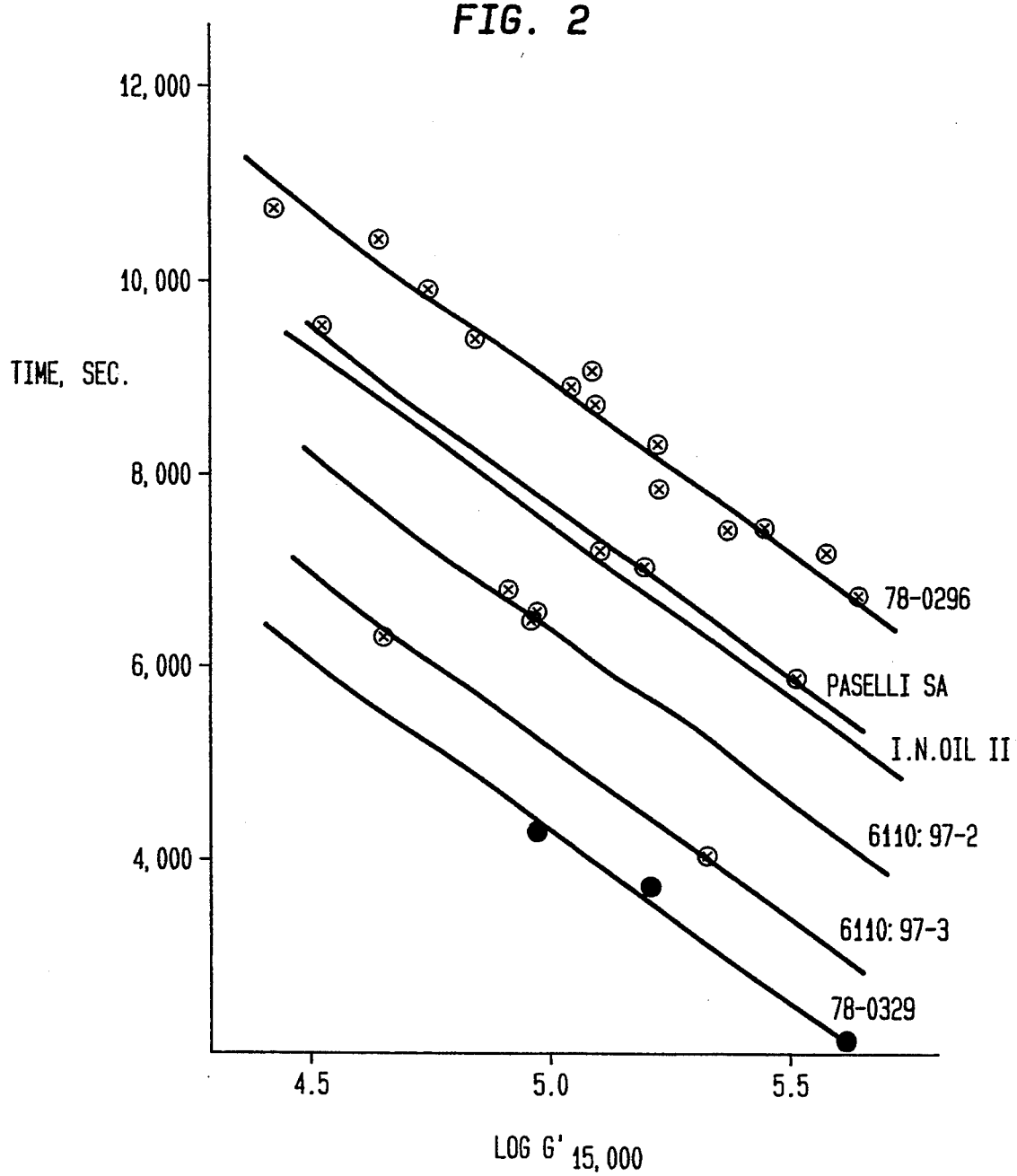
FIG. 2 illustrates the gelling characteristics of starches used in the spreads described in examples 1-6. In this figure, the time required to reach one-half $G'_{max}$ is plotted against the log $G'_{max}$ of the aqueous starch dispersions at various starch concentrations. The test method used to generate this graph is set forth in the testing methods section herein.

All dispersions were prepared by placing the starch sample into distilled water at room temperature and stirring the dispersion with a magnetic stirrer for about 30 minutes. The temperature of the starch dispersion was then raised to 85° C. (+/−2° C.) and the stirring was continued for at least an additional 15 minutes. (These steps were needed so that the sample would be fully dispersed and provide reproducible rheology measurements). The sample was then removed from the heat and quickly poured onto a rheometer plate (using a parallel plate geometry) which was maintained at 11° C. (+/−0.5° C.). Rheology measurements were recorded continuously until 15,000 seconds had elapsed following the loading of the sample onto the Instrument. Rheology characteristics were measured as G' versus time in seconds from the initial rheology preparation of the starch dispersion as illustrated in FIG. 1. Rheology characteristics were plotted as the time in seconds required to reach, one-half $G'_{max}$ versus the log of $G'_{max}$ as illustrated in FIG. 2. Results are reported from the plot shown in FIG. 2 in seconds required to reach one-half $G'_{max}$ at a log $G'_{max}$ value equal to 5.0.

Stability Test

This test is used to distinguish stable starches from gelling starches. Cooked starch dispersions containing from 10–50% solids should be capable of forming a gel after standing for 24 hr. at 4° C. The starches are cooked by heating an aqueous slurry containing the starch to 95°–100° C. and maintaining it for 15 minutes before cooling.

Stress-Strain Relationship Test

The rheological properties of a product can suitably be characterized by determining the stress-strain relation. This can be done with a series of measurements using a parallel plate "squeezing flow" geometry. The measurements are carried out using a parallel plate plastometer, wherein a block of the material to be tested is deformed between two parallel plates that move towards each other. (An apparatus that can suitably be used for these purposes is e.g., an Carrimed ® apparatus). The deformation is inflicted at constant rate, preferably at a rate of deformation of 0.0167s$^{-1}$ (i.e., 100% compression in 1 minute). Thus, if the thickness of the material to be tested is doubled, then the rate at which one plate is moved towards the other is also doubled. The corresponding stress at increasing deformation (strain) is determined by recording the force that is required to keep the rate of deformation constant while the deformation magnitude increases. A series of such measurements is carried out on a series of blocks of the material to be tested, having varying thicknesses. From this series of measurements the stress-strain relation of the material being tested is then obtained by extrapolating the results to infinite thickness. The stress $\sigma$, usually express in kpa is recorded as function of the strain $\epsilon$, wherein $\epsilon = \ln(H_o/H)$, $H_o$ indicating thickness of the test block, without any deformation, at the beginning of the measurement and H indicating the thickness of the block during the measurement while it is being squeezed between the two parallel plates. The stress-strain relation of a particular product is usually determined at a temperature representative for the temperature at which the product is to be used. Usually for the edible dispersion this will be between abut 5° C. and 25° C. In practice, mostly a temperature of about 15°–20° C. will be adequate. But, for example, for a product that is intended to be kept in a refrigerator, a temperature of e.g., 5° or 10° C. may be chosen. preferably, the stress-strain relation is measured at a temperature of 15° C.

Figure 3:
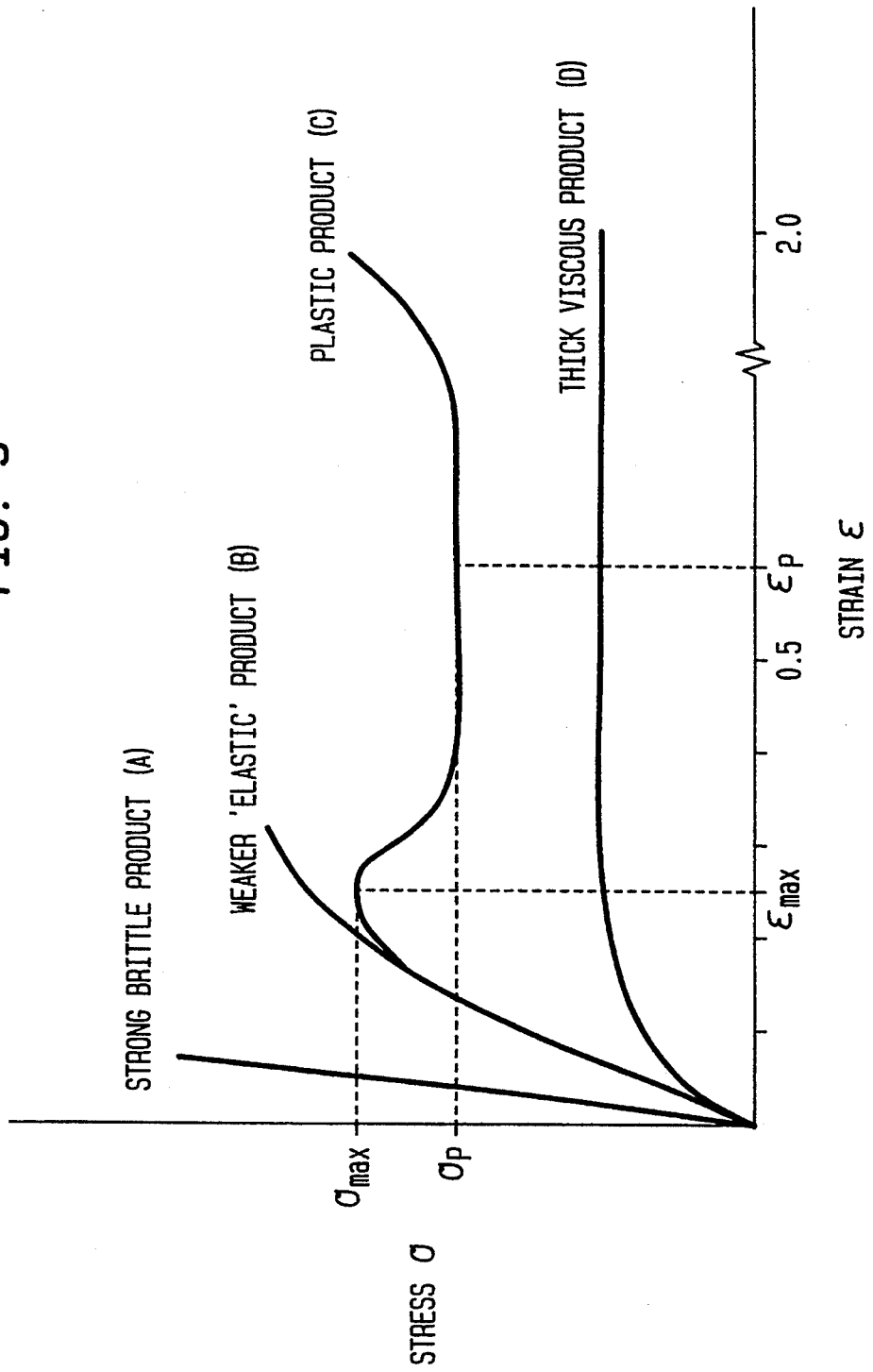
FIG. 3 is a graph illustrating typical stress strain relation curves of strong brittle products to plastic products as described in the specification.

In FIG. 3 four curves are shown, illustrating typical stress-strain relations of elastic products, brittle ones and plastic ones, and of very thick but still essentially liquid products that do not retain their shape for longer periods of time.

Curve (A) of FIG. 3 is typical for the stress strain relation of strong brittle products, for example chocolate. Curve (B) is illustrative for a weaker, more elastic product, e.g., a gelatin jelly, curve (C) for a plastic product such as butter or margarine, and curve (D) for a thick, viscous liquid product, for example a concentrated syrup.

Characterizing features of a curve for a plastic product, having a desirable rheology, are the strain ($\epsilon_{max}$) at which the stress through a maximum ($\sigma_{max}$), the magnitude of that maximum stress and the ratio of the so-called plastic stress ($\sigma_p$) and the maximum stress $\sigma_{max}$. In an ideal system, the curve of the plastic product exhibits a maximum in the stress at a relatively small deformation, i.e., and then exhibits, at somewhat large deformation, a region at which the stress remains constant at increasing deformation, i.e., showing a horizontal plateau. This part at which the slope of the curve ideally is zero, is called the plastic flow region. The stress in this region is called the plastic stress.

In practice, the curve of the stress-strain relation in the plastic flow region usually is not strictly horizontal. To prevent confusion about the point of the curve that determines the plastic stress, in case there is no horizontal plateau in the curve, the plastic stress is chosen to be the stress at the inflexion point. The strain at that point is indicated as $\epsilon_p$ $\sigma_{max}$, $\sigma_p$, $\Gamma_p$ $\epsilon_{max}$ are indicated in FIG. 3.

Generally, the present edible plastic dispersion has a stress-strain relation with a maximum stress occurring at a strain ($\epsilon_{max}$) of 0.001–2, the maximum stress at strain $\epsilon_{max}$ ($\sigma_{max}$) being 0.01–100 kpa and with a ratio of the plastic stress ($\sigma_p$) and the maximum stress $\sigma_{max}$ ($\sigma_p/\sigma_{max}$) of 0.1–1.

Preferably, the dispersion has a stress-strain relation with $\epsilon_{max}$ is 0.01–0.5, $\sigma_{max}$ is 0.3–60 kPa and $\sigma_{max}$ is 0.2–0.95. more preferably. $\epsilon_{max}$ is 0.05–03, $\sigma_{max}$ is 0.8–30 kPa and $\sigma_p/\sigma_{max}$ is 0.3–0.8.

The present dispersion can be prepared in various ways. For example, as described above, it can be prepared by admixing and homogenizing all ingredients and then allowing it to set. To obtain a product with optimal structure, it can, however, be advantageous to heat the composition (which is also advantageous because it facilities dissolution of ingredients and obtaining an essentially homogenized mixture and which can further also be desirable to pasteurize the composition) and then cool it again while subjecting it to working conditions. This can e.g., be done by passing it through two cooling units with a mixer in between.

Alternatively, one or more stirred or surface scraped cooling units can be used. A combination of such units can suitably be employed as well. Such a process can, for example, suitably be carried out in a Votator ® line with one or more surface scraped heat exchangers, optionally combined with one or more stirred, so-called crystallizers.

The present dispersion can suitably be used e.g., as bread spread to replace e.g., margarine or halvarine.

Furthermore, parts of the composition that would constitute the present dispersion, if allowed to set, can be incorporated in separate steps. For example, if the composition contains heat-sensitive ingredients, it can be beneficial to include a solution or dispersion of these ingredients after the pasteurization, whereas the other part is admixed with the pate composition before the pasteurization.

Other food products with reduced fat content can be made in a similar manner.

Accordingly, the invention provides food products containing the present dispersion or a composition that would constitute the present dispersion, if allowed to set, for example by keeping it at ambient temperatures, the balance consisting of edible matter.

The following examples illustrate, without limitation the subject invention.

EXAMPLE 1

Gelling starches of this invention were compared to gelling starches of the art for rheological properties when initially dispersed in water at either hot or cold temperatures.

Using the starch rheology test set forth in the testing methods herein, starch dispersions were prepared from Paselli SA2 ® maltodextrin and from the 6110:97-2 starch blend samples. One set of samples was initially dispersed in water at room temperature (25° C.) and fully dispersed as described in the testing methods section.

Another set of identical samples were initially dispersed in hot water (95° C.) prior to the rheology measurements and stirred as described in the testing methods for at least 30 minutes at 95° C. before placing the sample on the rheometer.

A sample of the 6110:97-2 starch blend that was initially dispersed in 25° C. water had rheological properties characterized by a one-half $G'_{max}$ at 6,467 seconds when log $G'_{max}$ is 5.0 At 95° C., a different sample of the 6110:97-2 sample had a one-half $G'_{max}$ at 7,130 seconds when log $G'_{max}$ is 5.0.

In contrast, a single batch of the Paselli SA2 ® maltodextrin had rheological properties characterized by a one-half $G'_{max}$ at 7,787 seconds at 25° C., and 10,150 seconds at 95° C. when log $G'_{max}$ is 5.0.

Thus, relative to a preferred starch blend herein, the Paselli SA2 ® maltodextrin of the art disadvantageously exhibited rheological properties that varied significantly depending upon the temperature at which the initial dispersion was prepared.

EXAMPLE 2

Two very low fat spread formulations containing starches known in the art were prepared for comparison as follows:

| Ingredients | % wt. in Product | |
|---|---|---|
|  | A | B |
| Instant N-Oil[R] II Starch[1] | 12 | — |
| Paselli SA2[R][2] | — | 12.0 |
| Gelatin | 3.0 | 3.0 |
| Lactic Acid (pH 5.0) | 0.09 | 0.09 |
| Buttermilk powder | 2.0 | 2.0 |
| Salt | 0.7 | 0.7 |

-continued

| Ingredients | % wt. in Product | |
|---|---|---|
| | A | B |
| Potassium Sorbate | 0.13 | 0.13 |
| Beta-Carotene | 0.05 | 0.05 |
| Kaomel[3] | 3.0 | 3.0 |
| Balance Water to | 100.0 | 100.0 |

[1]Instant N-oil(R) II starch is a starch having rheological properties characterized by a one half $G'_{max}$ at 7,650 seconds when log $G'_{max}$ is 5.0 (see FIG. 2) and is supplied by National Starch and Chemical Company of Bridgewater, NJ.
[2]Paselli SA2(R) is a modified food starch having a one half $G'_{max}$ at about 7,700 seconds when log $G'_{max}$ is 5.0 and is supplied by Avebe of Holland.
[3]Kaomel(R) is a hydrogenated vegetable oil (soybean/cottonseed) supplied by Van den Bergh Foods of Joliet, Ill.

Instant-N-Oil ® II starch was dispersed in cold water and heated while stirring in a tank to 80° C. to completely disperse the starch. Gelatin, buttermilk powder, potassium sorbate and beta-carotene were added to dissolve. The solution was then cooled to 60° C.

Lactic acid was added to obtain a pH of 5.0 and then melted Kaomel ® vegetable oil was added to the mixture still maintained at 60° C. The composition was then passed through a homogenizer at 100 bar to homogenize. The homogenized composition was pasteurized at 80° C. for 3 minutes. The pasteurized composition was then passed through a scraped surface heat exchanger and cooled to 5–10° C. The composition was filled into tubs and stored at 5° C.

The composition containing Paselli SA2 ® maltodextrin was made as described above.

Regarding texture mouthfeel and flavor it was observed that formulas containing Paselli SA2 ® maltodextrin and Instant N-Oil ® II starches spread smoothly, but had a thick pasty mouthfeel and had a strong off-flavor from the starch.

EXAMPLE 3

Three inventive compositions having concentrations of 9%, 10.72% and 12% starch 78:0296 were prepared according to Example 2 above.

78:0296 starch is a modified food starch having rheological properties characterized by a one half $G'_{max}$ at 8,950 seconds (see FIG. 2). The 78:0296 starch was purified by the process disclosed in Example 1 and 2 of the U.S. Ser. No. 07/832,838 filed Feb. 7, 1992 by Kasica et al. and was obtained from National Starch and Chemical Company of Bridgewater, NJ.

Formulas containing 78:0296 at all concentrations (9% wt., 10.72% wt. and 12% wt.) were smooth spreading, had a smooth mouthfeel and had little off-flavor. With respect to mouthfeel and flavor the 78:0296 formula was an improvement over the Paselli and Instant N-Ol ® II starch based formulas.

EXAMPLE 4

A third composition was prepared using 12% wt. starch 78:0323 according to the procedure of Example 2 except that the starch dispersion was heated to 90° C. instead of 80° C. This starch is a starch having rheological properties characterized by a log $G'_{max}$ of 5.0 at a solids content of 16% and a one half $G'_{max}$ at 4,750 seconds. The starch was obtained from National Starch and Chemical Company of Bridgewater, NJ.

The starch of 78:0323 based formula was observed to set up quicker than the Paselli SA2 ® maltodextrin, Instant N-Oil ® II starch and 78:0296 starch containing compositions but had an undesirable brittle spread texture.

EXAMPLE 5

An inventive formula using a modified maltodextrin starch 6110:97-2 at a concentration of 10% wt. was prepared as described in Example 2, except that the starch dispersion was heated for 10 minutes at 85° C. and 1.0 wt. % salt instead of 0.7 wt. % salt was used.

Starch blend 6110:97-2 is a blend of modified food starches having rheological properties characterized by a log $G'_{max}$ of 5.0 after complete dispersion in water at a starch solids of 17.2% and a one-half $G'_{max}$ at 6,467 seconds after initial dispersion at 25° C. in water, and was supplied by National Starch and Chemical Company of Bridgewater, NJ.

The 6110:97-2 starch blend formula had less of an off-flavor, smoother mouthfeel and a quicker setting time than the Paselli SA2 ® starch and Instant N-Oil ® II starch containing formulas of Example 2. It was also observed that the 6110:97-2 starch blend formula had less off-flavor and quicker setting time than 78:0296 starch containing formula (Example 3) and that 6110:97-2 starch containing formula had a smoother texture and less off-flavor than the 78:0323 starch containing formula (Example 4).

EXAMPLE 6

The following inventive compositions having 8.5 wt. % and a 10 wt. % concentration of 6110:97-3 starch were prepared as describe in Example 2 above:

| Ingredients | % wt. Starch in Product | |
|---|---|---|
| 6110:97-3 Starch | 8.5 | 10 |
| Gelatin | 3.0 | 3.0 |
| Potassium Sorbate | 0.13 | 0.13 |
| Beta-Carotene | 0.05 | 0.05 |
| Salt | 1.4 | 1.4 |
| Kaomax[1] | 3.0 | 3.0 |
| Water | 84.92 | 83.42 |

[1]Kaomax(R) is a hydrogenated vegetable oil (soybean/cottenseed) supplied by Van den Bergh Foods of Joliet, Ill.

Starch 6110:97-3 is a modified blend of food starches having rheological properties characterized by one-half $G'_{max}$ at 5,285 seconds when log $G'_{max}$ is 5.0.

The sample containing 8.5% 6110:97-3 starch was observed to set up quicker than other compositions containing higher concentrations of Paselli ® maltodextrin, 78:0296 starch and 6110:97-2 starch. The low fat spread compositions containing 6110:97-3 were observed to have a smooth mouthfeel and texture.

EXAMPLE 7

Two compositions having concentrations of 12% 78:0296 starch and 10% 6110:97-2 were prepared as described in Example 2. 28.2% whole milk was added as an additional protein and a fat source instead of 2% buttermilk powder and 3% Kaomel ® fat as used in Example 2. Additionally, 1.2 wt. % salt rather than 0.7 wt. % salt was used to make the samples.

Samples of compositions containing 6110:97-2 and 78:0296 starches were placed in tubs and cold stored at 5° C. At intervals of 24 hours for 30 days a sample was removed and the hardness of the spread was evaluated using the Stevens LFRA ® texture Analyzer. The Stevens values are presented in Table 1 below:

TABLE 1

| Day | Stevens Values 6110:97-2 (10%) | 78:0296 (12%) |
|---|---|---|
| 1 | 39 | too soft |
| 2 | 51 | — |
| 3 | — | 19 |
| 4 | * | — |
| 11 | — | — |
| 13 | 73 | — |
| 14 | — | 60 |
| 15 | — | — |
| 22 | 76 | — |
| 23 | — | 74 |
| 24 | — | — |
| 27 | 82 | — |
| 28 | — | 84 |
| 29 | — | — |

As shown in Table 1 above, it was observed that samples containing 6110:97-2 starch set relatively faster than samples containing 78:0296 starch.

EXAMPLE 8

Three compositions were made having concentrations of 12% Paselli SA2 ® maltodextrin, 12% 78:0296 starch, and 10% 6110:97-2 starch as described in example 2 except that Kaomel ® vegetable oil and buttermilk powder were not added in the compositions. Salt was present in an amount of 1.0 wt. % rather than of 0.7 wt. %.

Results of a measurement of starch setting to determine yield stress by the Carrimed apparatus as described above compared a sample of the 12% wt. Paselli SA2 ® maltodextrin formula (prior art) with a sample of each of the inventive formulas containing 10% of the 6110:97-2 and 12% wt. 78:0296. The results are presented in Table 2 below:

TABLE 2

| Sample | Yield Stress (pA) Time | | | |
|---|---|---|---|---|
| | 1 Hour | 1 Day | 7 Days | 14 Days |
| 6110:97-2 (10%) | 5.6 | 651 | 927 | 1163 |
| Paselli SA2(R) (12%) | 2.4 | 228 | 527 | 692 |
| 78:0296 (12%) | 3.0 | 84 | 471 | 598 |

The higher the yield stress value the greater the speed of setting of a sample,

The formula containing 6110:97-2 starch displayed the most rapid starch setting rates, The 78:0296 starch containing formula also displayed acceptable starch setting rates.

The prior art formulation containing Paselli SA2 ® maltodextrin was determined to be only about one-half the yield stress of the inventive formula containing starch blend 6110:97-2 even after 14 days.

EXAMPLE 9

Two compositions having concentrations of 8.5 wt. % 6110:97-2 and 8.5 wt. % 6110:97-3 starch were prepared as described in example 2 except Kaomax ® hydrogenated vegetable oil versus Kaomel ® hydrogenated vegetable oil was used. Additionally, there was no buttermilk in the samples and 1.5 wt. % salt rather than 0.7 wt. % salt was added.

Samples of the compositions were taken and evaluated using the Stevens LFRA ® texture Analyzer as described in Example 7. The Stevens values are presented in Table 3 below:

TABLE 3

| Day | Stevens Values 6110:97-2 Starch (8.5 wt. %) | 6110:97-3 Starch 8.5 wt. % |
|---|---|---|
| 1 hr | 6 | 14 |
| 3 | 33 | 46 |
| 6 | 40 | 48 |
| 10 | 42 | 49 |
| 19 | 44 | 52 |
| 26 | 49 | 57 |

In Table 3 above, it is noted that the 6110:97-3 starch containing compositions gelled relatively more quickly than the composition containing 6110:97-2 starch.

We claim:

1. An edible plastic dispersion not having a continuous fat phase, including at least two condensed phases, at least one of which is continuous which dispersion comprises:
   (a) 0.1 to 99 wt. % of a first gel-forming composition containing 1–8 times the critical concentration of a gelling agent selected from the group consisting of gelatin, kappa-carrageenan, iota-carrageenan, alginate, agar, gellan, pectin, furcelleran, locust bean gum, xanthan gum, guar gum and mixtures thereof; and
   (b) 1–99.9 wt. % of a second gel-forming composition containing 1–8 times the critical concentrations of a gelling starch having a rheological property in an aqueous dispersion characterized by a log one-half $G'_{max}$ value at no more than about 7,250 seconds when prepared at a concentration to yield a log $G'_{max}$ value of 5.0 at 11° C. at 15,000 seconds provided that the aqueous dispersion of the gelling starch is initially prepared at 0 to 40°.

2. An edible plastic dispersion according to claim 1, wherein the gelling starch has a one-half $G'_{max}$ at from 4,000 seconds to 7,000 seconds.

3. An edible plastic dispersion according to claim 2, wherein the gelling starch has a one-half $G'_{max}$ at from 5,500 seconds to 6,500 seconds.

4. An edible plastic dispersion according to claim 1, wherein the gelling agent is gelatin.

5. An edible dispersion according to claim 1, further comprising a dairy fat selected from the group of whole milk, semi-skimmed milk, skimmed milk, cultured buttermilk, buttermilk powder, skimmed milk powder, yogurt, quark, fromage frais, cottage cheese, whey powder, butter and mixtures thereof.

6. An edible dispersion according to claim 1, further comprising a thickening agent.

7. An edible dispersion according to claim 1, comprising no more than 20 wt. % of a fat.

8. An edible dispersion according to claim 7, comprising no more than 10 wt. % of a fat.

9. An edible dispersion according to claim 8, comprising no more than 4 wt. %.

10. An edible plastic dispersion according to claim 9, comprising no more than 0.2 wt. % of a fat.

* * * * *